US011866177B2

(12) United States Patent
Briquet et al.

(10) Patent No.: US 11,866,177 B2
(45) Date of Patent: Jan. 9, 2024

(54) DEPRESSURIZING SYSTEM AND METHOD FOR A CABIN OF AN AIRCRAFT ON THE GROUND FROM THE OUTER SIDE OF THE AIRCRAFT

(71) Applicant: Airbus Operations SAS, Toulouse (FR)

(72) Inventors: Clément Briquet, Toulouse (FR); Brice Auvray, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 193 days.

(21) Appl. No.: 17/348,191

(22) Filed: Jun. 15, 2021

(65) Prior Publication Data
US 2021/0387735 A1    Dec. 16, 2021

(30) Foreign Application Priority Data

Jun. 16, 2020 (FR) ...................................... 2006290

(51) Int. Cl.
 *B64D 13/00* (2006.01)
 *B64D 13/02* (2006.01)
 *B64D 41/00* (2006.01)
 B64D 13/06 (2006.01)

(52) U.S. Cl.
 CPC ............ *B64D 13/02* (2013.01); *B64D 41/00* (2013.01); *B64D 2013/0611* (2013.01)

(58) Field of Classification Search
 CPC ............... B64F 5/60; B64F 1/36; B64D 13/02
 USPC .................................................... 454/70, 74
 See application file for complete search history.

(56) References Cited

U.S. PATENT DOCUMENTS

| 3,616,471 A   | * | 11/1971 | Braun ...................... A47C 7/18 |
|               |   |         | 5/709                                 |
| 5,404,747 A   |   | 4/1995  | Johnston et al.                       |
| 2016/0157034 A1 | * | 6/2016  | Li ........................... F24F 13/24 |
|               |   |         | 381/56                                |
| 2017/0232978 A1 | * | 8/2017  | Zheng ....................... B66B 1/28 |
|               |   |         | 454/70                                |
| 2018/0073431 A1 | * | 3/2018  | Smith ....................... F02C 9/18 |

FOREIGN PATENT DOCUMENTS

| GB | 854021 A     | 11/1960 |
| KR | 20090007375 U | 7/2009  |

OTHER PUBLICATIONS

French Search Report; priority document.

\* cited by examiner

*Primary Examiner* — Ko-Wei Lin
(74) *Attorney, Agent, or Firm* — Greer, Burns & Crain, Ltd.

(57) ABSTRACT

A method for depressurizing a cabin of an aircraft on the ground from the outer side of the aircraft using a depressurizing system including a venting valve which can be actuated between open and closed positions by means of a shutter and which is connected in fluid terms to a vacuum pump and to a pressure tap port of the aircraft which is connected to a protection valve against excess pressure in the cabin. The method includes fluidly connecting the venting valve to the pressure tap port, the shutter being in the open position, moving the shutter to the closed position thereof and activating the vacuum pump to generate a reduced pressure in the region of the pressure tap port.

5 Claims, 3 Drawing Sheets

DEPRESSURIZING SYSTEM AND METHOD FOR A CABIN OF AN AIRCRAFT ON THE GROUND FROM THE OUTER SIDE OF THE AIRCRAFT

CROSS-REFERENCES TO RELATED APPLICATIONS

This application claims the benefit of the French patent application No. 2006290 filed on Jun. 16, 2020, the entire disclosures of which are incorporated herein by way of reference.

FIELD OF THE INVENTION

The present application relates to a system and a method which enables the time to be reduced for depressurizing a cabin of an aircraft on the ground from the outer side of the aircraft, for example, during a pressurization test.

BACKGROUND OF THE INVENTION

Pressurization tests are generally carried out on the ground on aircraft which have been subjected to structural repairs, but also for detecting potential leaks in the structure of the aircraft. These pressurization tests are carried out with the "Auxiliary Power Unit", APU, of the aircraft being operational in order to produce energy on board the aircraft in order to supply power to the different systems of the aircraft.

During a pressurization test of an aircraft on the ground, an emergency depressurization of the cabin of the aircraft can be activated only by stopping the operation of the APU via an emergency shutdown command, for example, located on the "Nose Landing Gear", NLG, of the aircraft. The stoppage of the APU enables the cabin of the aircraft to be depressurized in accordance with the natural leakage rate of the aircraft.

SUMMARY OF THE INVENTION

An object of the present invention is to provide an improvement of the emergency depressurizing means of the cabin of an aircraft on the ground from the outer side of the aircraft.

To this end, the invention relates to a depressurizing system for a cabin of an aircraft on the ground from the outer side of the aircraft, the aircraft being provided with a protection valve against excess pressure in the cabin which is connected to a pressure tap port.

According to the invention, the depressurizing system comprises a vacuum pump which is configured to produce a reduced pressure, connection means and a venting valve which can be actuated between an open position and a closed position via a shutter and which is connected in fluid terms, via the connection means, to the vacuum pump and to the pressure tap port.

Advantageously, the system according to the invention enables a rapid depressurization of an aircraft to be initiated on the ground, in particular an aircraft on which pressurization tests are carried out, from the outer side of the aircraft. This is because the depressurizing system, using the vacuum pump and with the shutter of the venting valve in the closed position, enables a pressure difference to be simulated in the region of the pressure tap port between the interior and the exterior of the aircraft, which results in opening of the protection valve of the aircraft being triggered and therefore a depressurization of the cabin.

This system thus enables the safety of the pressurization tests of an aircraft on the ground to be improved, by enabling rapid depressurization of the cabin of the aircraft on the ground, from the outer side thereof.

According to another feature, the shutter is provided with a locking means which is configured to hold the shutter in an open position. The locking means may comprise a lead wire.

According to another feature, the connection means comprise, at one end, a connector with a conical thread which is configured to be adapted to the pressure tap port.

According to another feature, the depressurizing system comprises a pressure indicator.

According to another feature, the depressurizing system is transportable. In other words, the depressurizing system comprises a case in which the vacuum pump, the venting valve and the connection means are arranged in order to be transported.

The invention also relates to a depressurizing method for a cabin of an aircraft on the ground from the outer side of the aircraft, using a depressurizing system comprising a venting valve which can be actuated between an open position and a closed position by means of a shutter and which is connected in fluid terms, via connection means, to a vacuum pump, the aircraft being provided with a protection valve against excess pressure in the cabin which is connected to a pressure tap port.

According to the invention, the method comprises the steps involving:

a fluid connection, via the connection means, of the venting valve to the pressure tap port of the aircraft, the shutter being in an open position;

a movement of the shutter of the venting valve from the open position to the closed position thereof; and activation of the vacuum pump in order to produce a reduced pressure in the inner volume of the connection means and the venting valve in order to generate a reduced pressure in the region of the pressure tap port of the aircraft.

According to another feature, the aircraft comprises an auxiliary power unit which is operational. According to this feature, the method comprises, before the step of moving the shutter, a step involving a shutdown of the auxiliary power unit.

According to another feature, the shutter is provided with a locking means which is configured to hold the shutter in an open position. According to this feature, the method comprises, before the step of moving the shutter, a step involving a deactivation of the locking means in order to enable a movement of the shutter from the open position to the closed position thereof.

According to another feature, the locking means comprises a lead wire which is configured to retain the shutter in an open position. According to this feature, the step of deactivating the locking means involves cutting the lead wire.

According to another feature, the movement of the shutter between the open position and the closed position thereof is controlled electrically, and the venting valve comprises a switch or an actuator which is connected electrically to the shutter and which is configured to move the shutter from the open position to the closed position thereof According to this feature, the method comprises a step involving activating the switch or the actuator in order to move the shutter from the open position to the closed position thereof.

BRIEF DESCRIPTION OF THE DRAWINGS

Other features and advantages will be appreciated from the following description of the invention which is given purely by way of example with reference to the appended drawings, in which.

DETAILED DESCRIPTION OF THE PREFERRED EMBODIMENTS

Figure 1:
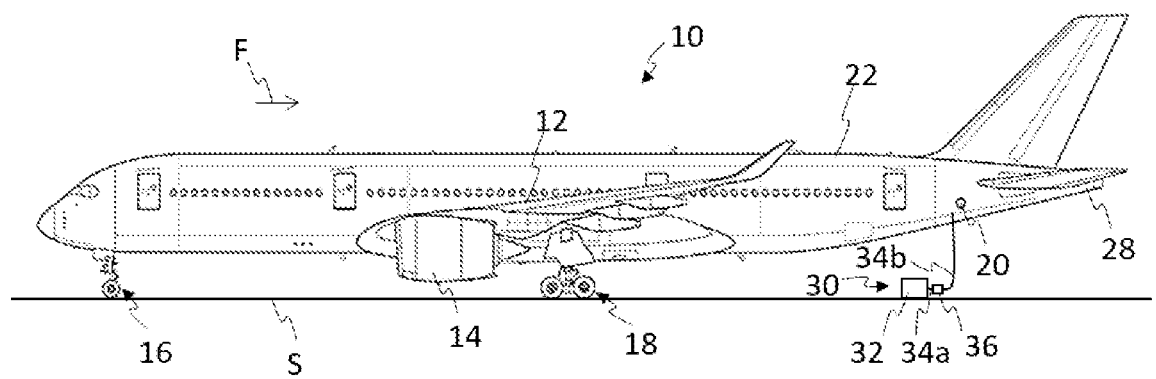
FIG. 1 is a side view of an aircraft on the ground to which a depressurizing system is connected, which illustrates an embodiment of the invention.

FIG. 1 shows an aircraft 10 on the ground, the line S representing the ground, to which aircraft 10 a depressurizing system 30 of the cabin of the aircraft is connected. The depressurizing system is arranged at the outer side of the aircraft 10. The aircraft 10 may be a short, medium or long-haul aircraft. The aircraft 10 comprises a wing 12 under which there is fixed a propulsion system 14 which comprises a turbomachine. The aircraft 10 also comprises an auxiliary power unit 28 located at the rear of the aircraft 10.

In the following description, the terms relating to a position are given with reference to the movement direction of the aircraft 10 when the turbomachine is operational, this movement direction being depicted by the arrow F.

The aircraft 10 comprises at least one landing gear, in this instance a nose landing gear 16 and a tail landing gear 18.

The aircraft 10 is also provided, in a conventional manner, with a protection valve 20 against excess pressure ("Overpressure Relief Valve", ORV) in the cabin. The protection valve 20 is located on the fuselage 22 at the rear of the aircraft 10 and serves to protect the aircraft in the event of excess pressure in the cabin. The protection valve 20 comprises, in a known manner, a pressure tap port (designated 24 in FIGS. 2 and 3), also located on the fuselage 22. Connection means (illustrated with dotted lines in FIGS. 2 and 3 and designated 26) connect the protection valve 20 and the pressure tap port 24. In a conventional manner, when a pressure difference between the interior and the exterior of the aircraft is excessively large (between 700 mbar and 720 mbar), the protection valve 20 opens automatically, which enables air to be discharged from the cabin, and therefore enables the cabin to be depressurized.

The term "cabin of the aircraft" is intended to be understood to refer to the interior of the aircraft, that is to say, the assembly which is composed of the cabin in which the passengers of the aircraft are located, the flight deck, avionics bays and the cockpit of the aircraft.

The depressurizing system 30 of the cabin of the aircraft comprises a venting valve 36 which can be actuated between an open position and a closed position by means of a shutter (designated 40 in FIGS. 2 and 3) and which is connected, on the one hand, to a vacuum pump 32 and, on the other hand, to the pressure tap port 24, via connection means 34a, 34b.

Figure 2:
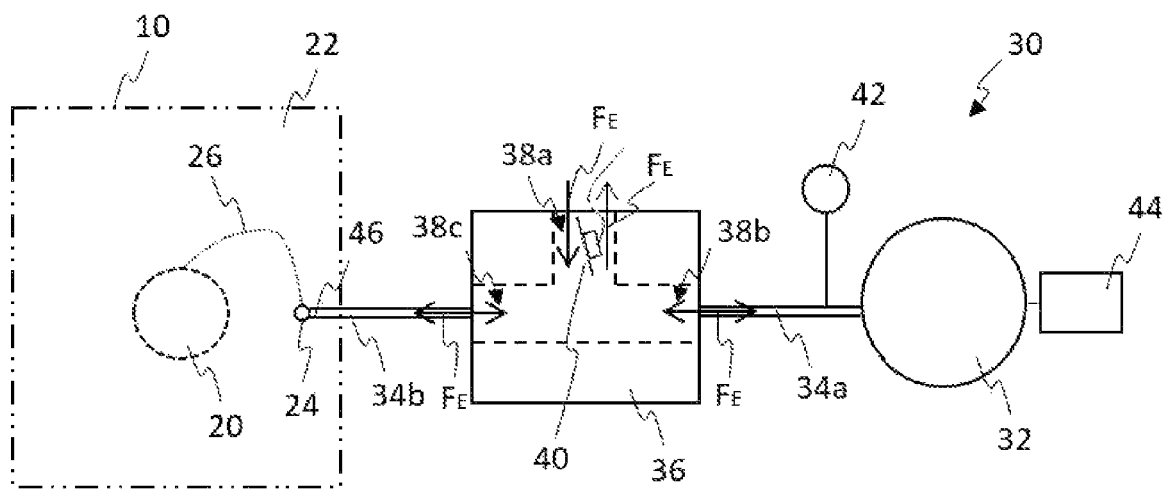
FIG. 2 is a schematic view of a depressurizing system which illustrates an embodiment of the invention, a shutter of a venting valve of the depressurizing system being in an open position.
Figure 3:
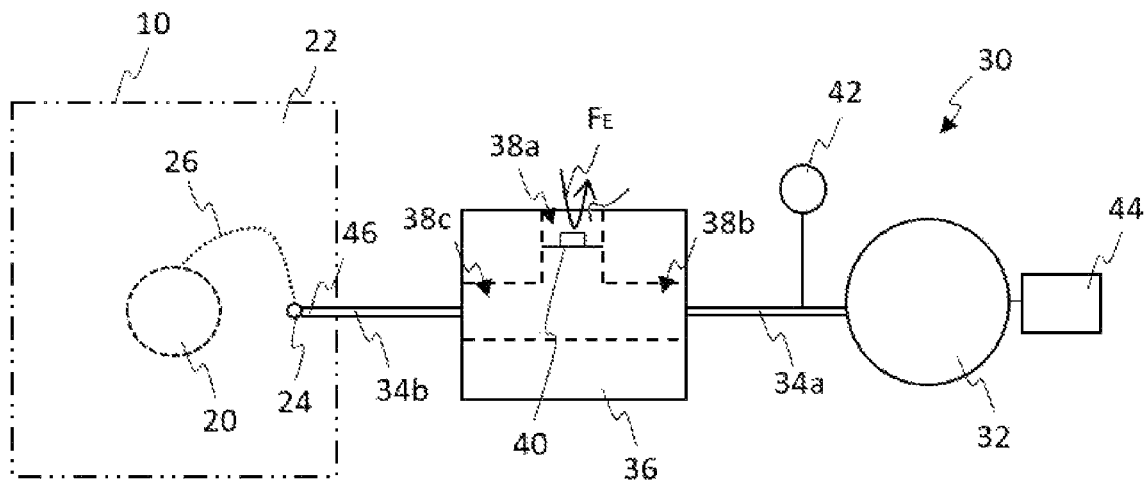
FIG. 3 is a schematic view of a depressurizing system which illustrates an embodiment of the invention, a shutter of a venting valve of the depressurizing system being in the closed position.

The depressurizing system 30 is illustrated in greater detail in FIGS. 2 and 3.

The venting valve 36 comprises first, second and third channels 38a, 38b, 38c in mutual fluidic communication.

The shutter 40 is arranged in the first channel 38a and can be moved between an open position (illustrated in FIG. 2), in which an external fluid FE circulates in the channels 38a, 38b, 38c and the connection means 34a, 34b, and a closed position (illustrated in FIG. 3), in which the circulation of an external fluid FE in the channels 38a, 38b, 38c and the connection means 34a, 34b is blocked. The shutter 40 may be movable in translation along the first channel 38a or may be movable in rotation in the first channel 38a, as illustrated in FIGS. 2 and 3. The movement of the shutter 40 between the open position and the closed position thereof may be controlled manually or electrically. When the control is electrical, the venting valve 36 comprises a switch or an actuator which is connected electrically to the shutter 40 and which is configured to move the shutter from the open position to the closed position thereof, and vice versa. In order to move the shutter from the open position to the closed position thereof, and vice versa, it is necessary to activate the switch or the actuator, which then electrically activates the movement of the shutter. In this instance, the venting valve 36 is preferably provided with a protection cover which is arranged around the switch or the actuator in order to prevent incorrect manipulation, and therefore undesirable closure of the shutter 40.

The second channel 38b of the venting valve 36 is connected in fluid terms to the vacuum pump 32, via the connection means 34a, and the third channel 38c of the venting valve 36 is configured to be connected in fluid terms to the pressure tap port 24, via the connection means 34b. To this end, the connection means 34b comprise, at the end 46 thereof which is intended to be connected to the pressure tap port 24, a connector (designated 48 in FIG. 4) which is configured to be adapted to the pressure tap port 24, for example a connector with a conical thread.

When the shutter 40 is in a closed position, and when the third channel 38c is connected in fluid terms to the pressure tap port 24, the air circulates in the inner volume of the channels 38a, 38b, 38c and the connection means 34a, 34b in a closed circuit.

The connection means 34a, 34b are pipes which are configured to withstand a reduced pressure. The connection means 34a, 34b may be reinforced flexible pneumatic pipes, in particular which are generally used for airspeed indicator tests.

The vacuum pump 32 is configured, during operation, to draw in air present in the inner volume which is delimited by the connection means 34a, 34b and the channels 38a, 38b, 38c of the venting valve 36. The vacuum pump 32 is controlled electrically. The vacuum pump 32 is connected to a vacuum reservoir 44.

When the shutter 40 is in a closed position, and when the vacuum pump 32 is operational, at least a portion of the air present in the inner volume of the connection means 34a, 34b and the channels 38a, 38b, 38c of the venting valve 36 is suddenly drawn into the vacuum reservoir 44, thus rapidly generating a reduced pressure in this inner volume.

The depressurizing system 30 may also comprise a pressure indicator 42, such as a pressure gauge, which is configured to measure and display the pressure in the connection means 34a, 34b and the venting valve 36.

Figure 4:
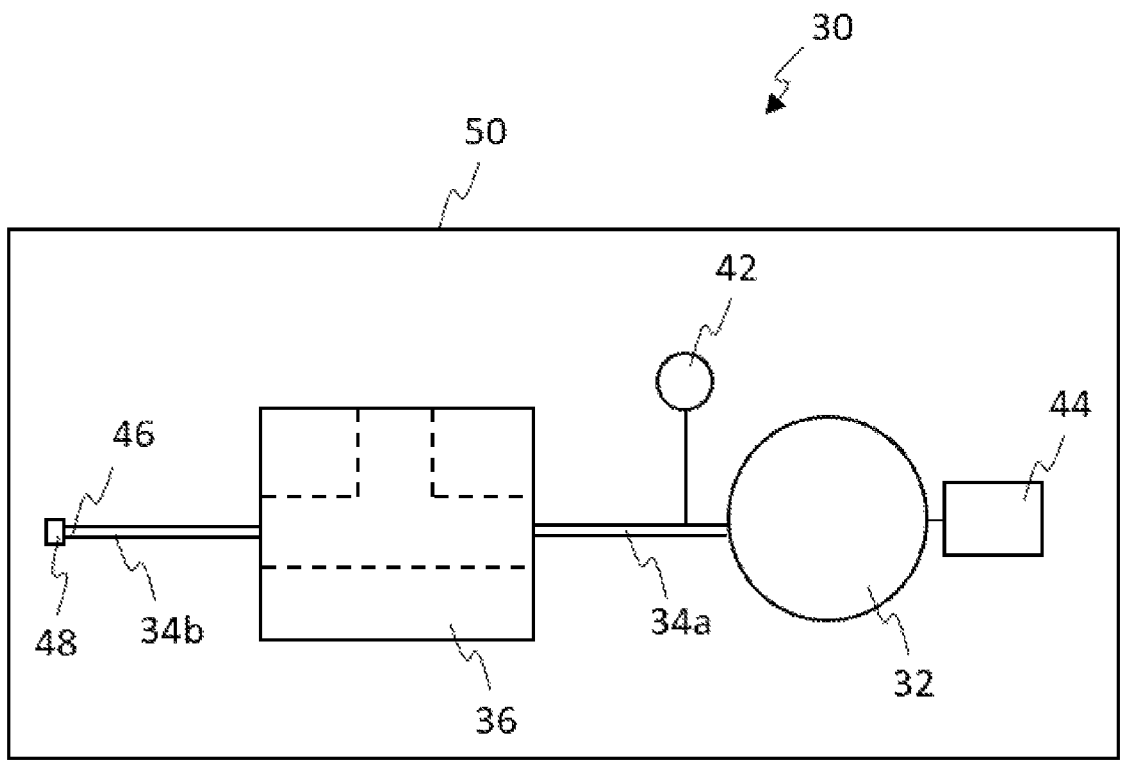
FIG. 4 is a schematic view of a depressurizing system, which illustrates an embodiment of the invention, in a case.

As illustrated in FIG. 4, the depressurizing system 30 can be transported. In other words, the depressurizing system 30 comprises a case 50 in which the vacuum pump 32, the vacuum reservoir 44, the pressure indicator 42, the venting valve 36 and the connection means 34a, 34b are arranged in order to be transported. For the transport of the depressurizing system 30, the connection means 34a, 34b may be disconnected from the vacuum pump 32 and the venting valve 36.

The operation of the depressurizing system 30 as described above during a method for depressurizing a cabin of an aircraft on the ground will now be described.

According to a preferred embodiment, the depressurizing system 30 is, prior to a pressurization test on the aircraft 10 on the ground, connected to the pressure tap port 24 via the connection means 34b. The pressure tap port 24 being arranged on the fuselage 22 of the aircraft, therefore at a height relative to the ground S, the operator fluidically connecting the third channel 38c of the venting valve 36 to the pressure tap port 24 can use any known elevation device in order to assist the establishment of this connection. During this connection, the shutter 40 is in an open position in order to preserve the first function of the protection valve 20, that is to say, a protection against excess pressure in the cabin of the aircraft 10.

During the pressurization test, the auxiliary power unit 28 is operational in order to produce energy on board the aircraft 10 in order to supply power to the various systems of the aircraft, such as the electrical voltage, the pneumatic and hydraulic pressures, the ventilation, etc.

In case of an emergency, during a pressurization test, an operator on the ground, outside the aircraft 10, controls the stoppage of the auxiliary power unit 28. The emergency shutdown control of the auxiliary power unit 28 is, for example, located on the nose landing gear 16. The auxiliary power unit 28 being an air supply source for devices which are configured to pressurize the aircraft 10, in order to depressurize the aircraft 10 it is necessary to stop the air supply, and therefore to cease the operation of the auxiliary power unit 28. After the auxiliary power unit 28 has been stopped, the devices which are configured to pressurize the aircraft 10 are no longer supplied and stop. During the use of the depressurizing system 30, the shutdown of the auxiliary power unit 28 enables more rapid depressurization of the cabin of the aircraft 10. This is because, if the auxiliary power unit 28 is operational during the use of the depressurizing system 30, air will continue to arrive in the cabin of the aircraft and more time will thus be required to depressurize it completely.

Then, the shutter 40 is moved from the open position to the closed position thereof, then the vacuum pump 32 is activated in order to produce reduced pressure in the inner volume delimited by the connection means 34a, 34b and the channels 38a, 38b, 38c of the venting valve 36. The vacuum pump 32 is activated in order to create a reduced pressure in the region of the pressure tap port 24.

In a variant, in order to prevent incorrect handling, the shutter 40 is provided with a locking means which is configured to hold it in the open position. The locking means, when the depressurizing system 30 is connected to the pressure tap port 24 of the aircraft 10, enables the first function of the protection valve 20 to be retained. This is because the venting valve 36 enables the first function of the protection valve 20 of the aircraft to be retained, which is to protect the cabin of the aircraft against excess pressure in the event of a pressurization. The protection valve 20 continuously measures the external pressure, via the pressure tap port 24. The venting valve 36 is thus in a secured open position. In order to move the shutter from the open position to the closed position thereof, the locking means is deactivated.

The locking means comprises a lead wire which is arranged to hold the shutter 40 in an open position. In order to move the shutter from the open position to the closed position thereof, the lead wire is cut, which releases the locking of the shutter into the open position. In the event of an emergency, in order to activate the depressurizing system 30, it is therefore necessary to break the lead wire and to move the shutter 40 from the open position to the closed position thereof.

According to this variant, when the venting valve 36 is controlled electrically, the protection cover is optional.

In a variant, the venting valve 36, which is electrically controlled, is provided with dual protection against incorrect manipulation, that is to say, of the protection cover and the locking means.

According to another embodiment, the depressurizing system 30 is connected to the pressure tap port 24 of the aircraft 10 only in the event of an emergency during the pressurization test, in particular after stoppage of the auxiliary power unit 28. In this instance, the shutter 40 will be able to be in the closed position when the depressurizing system 30 is connected to the pressure tap port 24 of the aircraft 10. In any case, the shutter 40 will be in a closed position when the vacuum pump 32 is activated in order to have a closed circuit of air between the pressure tap port 24 and the vacuum pump 32.

The depressurizing system 30, using the vacuum pump 32, thus enables a pressure difference between the interior and the exterior of the aircraft 10 to be simulated. This pressure difference is sensed by the pressure tap port 24 which will then order an immediate opening of the protection valve 20 against excess pressure. The vacuum pump 32 is activated in order to enable the protection valve 20 to be opened, for the entire duration of the depressurization of the cabin of the aircraft 10, in order to keep the protection valve 20 open until the complete depressurization of the cabin of the aircraft 10. The protection valve 20 is kept open until complete depressurization of the cabin of the aircraft 10 since, via the first function thereof, the protection valve 20 controls the pressure in the cabin of the aircraft on the basis of a pressure difference between the interior and the exterior of the aircraft. If the pressure difference between the interior and the exterior of the aircraft is below a predetermined threshold, the protection valve 20 closes. For this reason, it is necessary to simulate a pressure difference between the interior and the exterior of the aircraft sufficient to keep the protection valve 20 in the open position until complete depressurization of the cabin of the aircraft 10.

A vacuum pump 32 which is electrically controlled, compared with the use of a manual pump, enables an operator to be prevented from having to permanently pump until complete depressurization of the cabin of the aircraft 10, but also enables more rapid depressurization of the cabin of the aircraft 10.

The use of the depressurizing system 30 enables rapid depressurization of the cabin of the aircraft. Following this depressurization, the operators on the ground, outside the aircraft, carrying out or monitoring the pressurization test, can open the doors of the aircraft and enter it.

The power of the vacuum pump 32 required for opening the protection valve 20 decreases when the pressure in the cabin of the aircraft increases. For example, for a cabin pressure between 600 mbar and 700 mbar, a pressure of the vacuum pump 32 between 60 mbar and 75 mbar is sufficient.

As the protection valve 20 has to be kept in the open position thereof until the cabin of the aircraft is completely depressurized, the vacuum pump 32 is configured to apply a negative pressure relative to atmospheric pressure. For example, the vacuum pump 32 may be configured to apply a negative pressure between 660 mbar and 775 mbar (for a cabin pressure between 600 mbar and 700 mbar).

The depressurizing system according to the invention thus enables the depressurization of a cabin of an aircraft on the ground from the outer side of the aircraft to be accelerated and therefore enables the safety of the pressurization tests to be improved.

Figure 5:
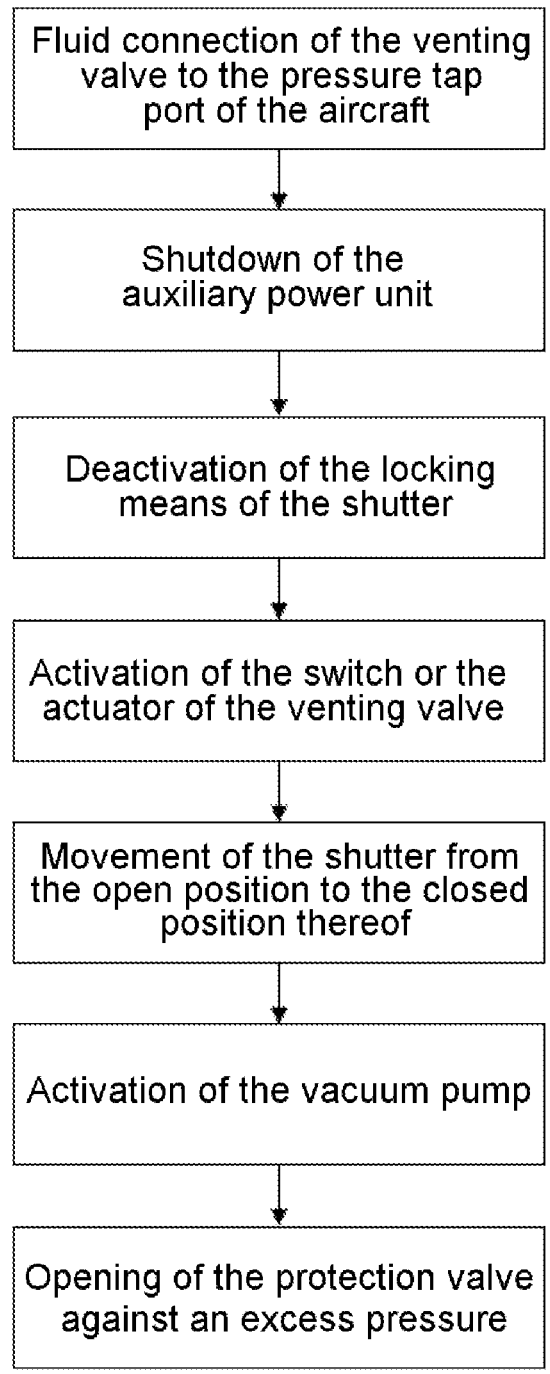
FIG. 5 is a flow chart of the method for depressurizing a cabin of an aircraft on the ground from the outer side of the aircraft, which illustrates an embodiment of the invention.

FIG. 5 shows the different steps of the method for depressurizing a cabin of an aircraft 10 on the ground from the outer side of the aircraft, using a depressurizing system 30 as described above. The method thus comprises a step of fluid connection, using the connection means 34a, 34b, of the venting valve 36 to the pressure tap port 24 of the aircraft 10, the shutter 40 being in an open position. The method then comprises a step involving a shutdown of the auxiliary power unit. Of course, the auxiliary power unit can be stopped before connecting the venting valve 36 to the pressure tap port 24 of the aircraft 10. When the shutter 40 is provided with a locking means, the method then comprises a step involving a deactivation of the locking means. For example, when the locking means comprises a lead wire, the deactivation of the locking means involves cutting the lead wire. Then, when the shutter 40 is electrically controlled, the method involves a step of activating the switch or the actuator of the venting valve 36, which enables the shutter 40 to be moved from the open position to the closed position thereof. The method then comprises a step of activating the vacuum pump 32 in order to produce a reduced pressure in the inner volume of the connection means 34a, 34b and the venting valve 36 in order to generate a reduced pressure in the region of the pressure tap port 24 of the aircraft. This pressure difference simulated between the interior and the exterior of the aircraft will enable the protection valve 20 to be opened.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin depressurizing method for a cabin of an aircraft on the ground from the outer side of the aircraft using a depressurizing system comprising a venting valve having a shutter actuatable between an open position and a closed position, the venting valve connected in fluid terms, via connection means, to a vacuum pump, the aircraft being provided with a protection valve against excess pressure in the cabin which is connected to a pressure tap port, the method comprising the steps:
   fluidly connecting, via the connection means, the venting valve to the pressure tap port of the aircraft from the outer side of the aircraft while the aircraft is on the ground, the shutter being in the open position;
   moving the shutter of the venting valve from the open position to the closed position thereof; and
   activating the vacuum pump to produce a reduced pressure in an inner volume of the connection means and the venting valve to generate a reduced pressure in a region of the pressure tap port of the aircraft.

2. The method as claimed in claim 1, wherein the aircraft comprises an auxiliary power unit which is operational and wherein the method comprises, before the step of moving the shutter, a step of shutting down the auxiliary power unit.

3. A depressurizing method for a cabin of an aircraft on the ground from the outer side of the aircraft, using a depressurizing system comprising a venting valve having a shutter actuatable between an open position and a closed position, the venting valve connected in fluid terms, via connection means, to a vacuum pump, the aircraft being provided with a protection valve against excess pressure in the cabin which is connected to a pressure tap port, the method comprising the steps:
   fluidly connecting, via the connection means, the venting valve to the pressure tap port of the aircraft, the shutter being in the open position;
   moving the shutter of the venting valve from the open position to the closed position thereof; and
   activating the vacuum pump to produce a reduced pressure in an inner volume of the connection means and the venting valve to generate a reduced pressure in a region of the pressure tap port of the aircraft,
   wherein the shutter is provided with a locking means which is configured to hold the shutter in the open position, and
   wherein the method comprises, before the step of moving the shutter, a step of deactivating the locking means to enable a movement of the shutter from the open position to a closed position thereof.

4. The method as claimed in claim 3,
   wherein the locking means comprises a lead wire configured to retain the shutter in the open position, and
   wherein the step of deactivating the locking means involves cutting the lead wire.

5. The method as claimed in claim 1,
   wherein a movement of the shutter between the open position and the closed position thereof is controlled electrically, and the venting valve comprises a switch or an actuator which is connected electrically to the shutter and which is configured to move the shutter from the open position to the closed position thereof, and
   wherein the method comprises a step of activating the switch or the actuator to move the shutter from the open position to the closed position thereof.

* * * * *